United States Patent [19]

Stockman

[11] Patent Number: 5,179,617
[45] Date of Patent: Jan. 12, 1993

[54] DEVICE FOR USE IN CONNECTING OPTICAL FIBRE CABLES

[76] Inventor: Anthony J. Stockman, Haven House, 47 Fore Street, Framlingham, Suffolk, IP13 9DD, United Kingdom

[21] Appl. No.: 670,260

[22] Filed: Mar. 15, 1991

Related U.S. Application Data

[63] Continuation-in-part of Ser. No. 527,952, May 24, 1990, abandoned.

[30] Foreign Application Priority Data

May 24, 1989 [GB] United Kingdom ............... 8911889

[51] Int. Cl.$^5$ ............................................. G02B 6/36
[52] U.S. Cl. ............................ 385/136; 81/473; 81/477; 411/341
[58] Field of Search ............... 350/96.20, 96.21, 96.22; 411/341; 81/473, 477; 385/136, 138

[56] References Cited

U.S. PATENT DOCUMENTS

| | | | |
|---|---|---|---|
| 2,409,385 | 10/1946 | Pletcher | 81/477 |
| 2,619,860 | 12/1952 | Gray | 81/477 |
| 4,082,422 | 4/1978 | Kloots | 350/96.23 |
| 4,526,067 | 7/1985 | Gaquere | 81/477 |
| 4,534,617 | 8/1985 | Kloots et al. | 350/96.20 |
| 4,652,082 | 3/1987 | Warner | 350/96.20 |
| 4,653,848 | 3/1987 | Kloots | 350/96.22 |
| 4,749,251 | 6/1988 | Moulin | 350/96.20 |
| 4,834,487 | 5/1989 | Abendschein et al. | 350/96.20 |
| 5,000,533 | 3/1991 | Gerwers | 350/96.20 |

FOREIGN PATENT DOCUMENTS 131488 1/1985 European Pat. Off. .

OTHER PUBLICATIONS

Miller et al., *SPIE Proceedings*, vol. 479, 1984, Fiber Optic Connectors, "Optical Fiber Splices and Connectors".

Ponseggi et al., *SPIEE Proceedings*, vol. 574, 1984, Fiber Optic Connectors, "High Speed Photography, Videography, and Photonics III".

*Primary Examiner*—Frank Gonzalez
*Attorney, Agent, or Firm*—Kinzer, Plyer, Dorn, McEachran & Jambor

[57] ABSTRACT

To connect optical fibre cables to a terminal, the cable is provided with an end fitting by which it can be connected to the terminal. The end fitting includes a nut which makes the connection with the terminal. A connection device is fitted over the cable and has a head which fits over the nut, a flexible sheath and a grip portion connected to the head by the sheath so that the head is rotated when the grip portion is turned.

19 Claims, 11 Drawing Sheets

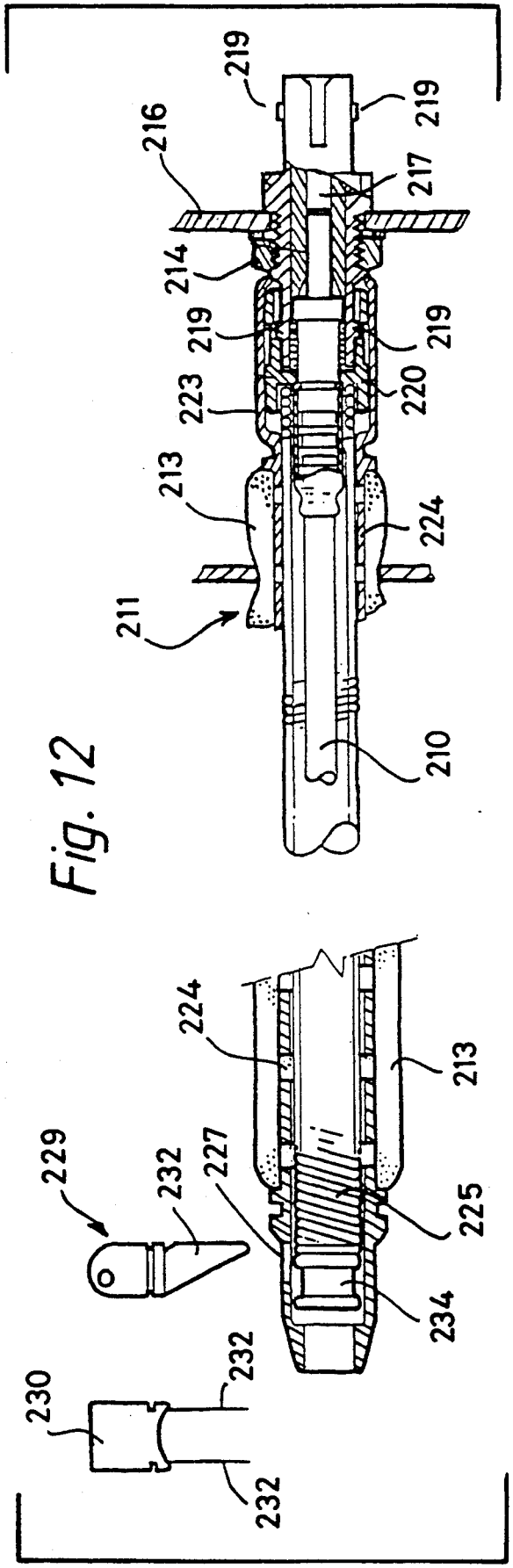
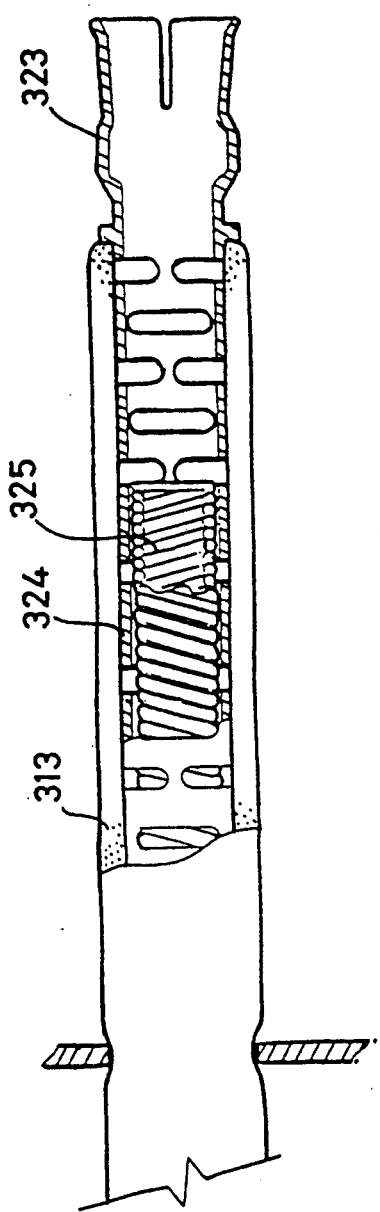
Fig. 12
Fig. 15

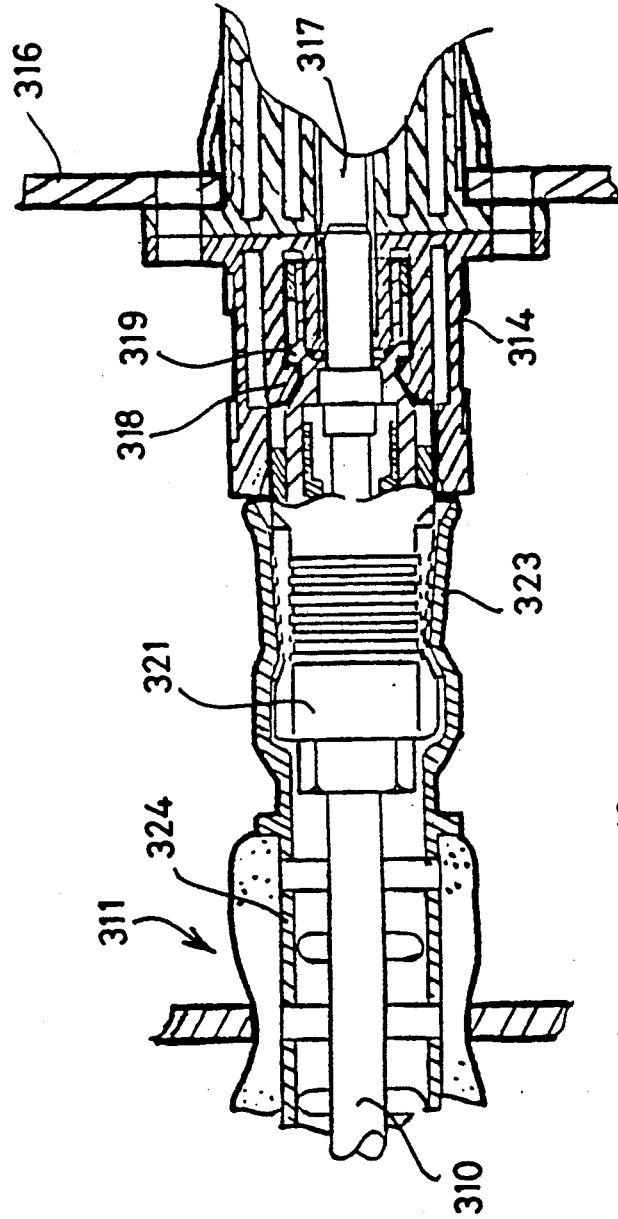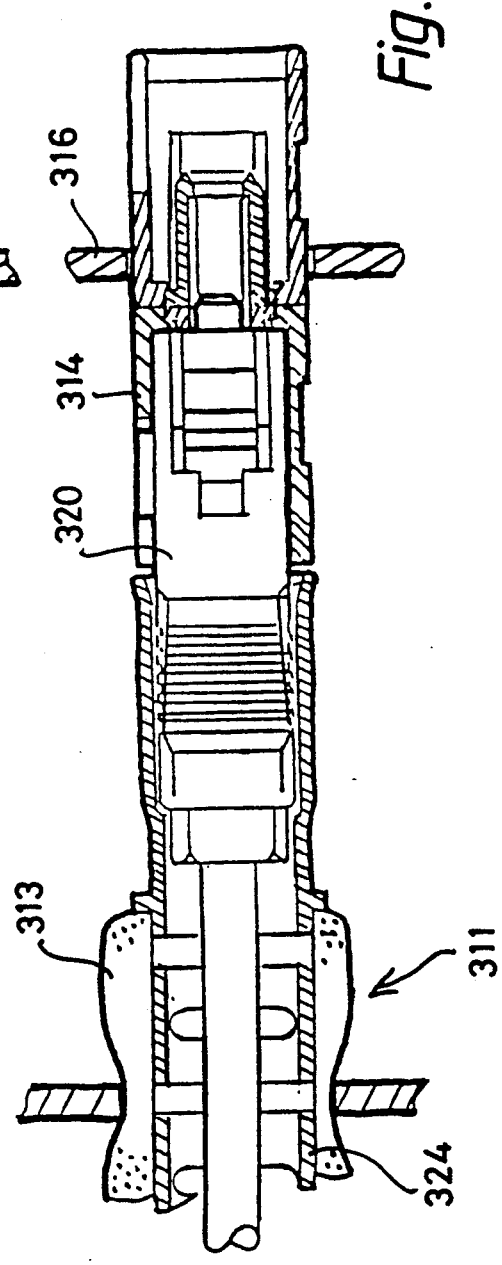

DEVICE FOR USE IN CONNECTING OPTICAL FIBRE CABLES

This case is a continuation-in-part of prior U.S. Ser. No. 07/527,952 filed May 24, 1990 (now abandoned).

FIELD OF THE INVENTION

This invention relates to a device for use in connecting optical fibre cables, to the combination of an optical fibre cable with a connection device, and to an optical fibre terminal plate arrangement.

BACKGROUND TO THE INVENTION

Optical fibres as used in optical communications applications are normally protected by a cable sheath to prevent damage to the delicate fibre itself. Lengths of optical cable have to be connected to optical transmitters and receivers and also end to end to provide continuous optical paths between the transmitters and receivers. It is important that these connections be accurately and consistently made in order to ensure that a proper transmission path is achieved and that the fibre is not damaged.

Some optical cables are provided at their ends with connectors which have threaded terminal fittings by which the cable is connected to a corresponding connector or other interface, for example on a patch panel where there may be terminals for a number of such cables. Other cables are connected to terminal fittings by push-on connections or by bayonet type connections.

With all of these connector types, where there is a high density of cables connected to a patch panel, it can be quite difficult to connect or disconnect a particular cable because the accessibility of the corresponding terminal is hindered by all the other cables.

SUMMARY OF THE INVENTION

According to the invention, there is provided a device for use in connecting optical fibre cables, the device comprising a head directly mounted on the device with means for mounting the head on a terminal end of an optical fibre cable, a flexible sheath extending axially from the head and surrounding the cable, and a grip portion connected to the head by the sheath so that motion of the grip portion is transmitted through the sheath to the head.

The head may be moulded integrally with the cable outer shell, or may engage with a separate terminal fitting already secured to the cable end.

The use of such a device, which can be permanently mounted on the end of an optical cable, allows a terminal fitting on the end of the cable to be connected to an appropriate terminal by moving the grip portion which is axially spaced away from the terminal, either in rotation or in an axial direction. Where there is a high density of terminals on a terminal plate or patch panel, the moving of the point where torque is to be applied along the cables makes connection much easier.

Where the terminal fitting is a threaded nut, the head may slide over the nut to grip the nut. The nut may have a hexagon form or any other external shape that can be gripped. For example, a knurled cylindrical nut may be used.

Where the terminal fitting is a bayonet connector, the head may engage with the connector in such a way that both axial and rotational movements can be transmitted between the head and the fitting.

Where the terminal fitting is a push-fit connector, the head may engage with the fitting in such a way that axial movement can be transmitted between the head and the fitting.

The device may comprise an inner sleeve and an outer sleeve. In the case of a push-fit connector, the outer sleeve may move relative to the inner sleeve, and this movement can either be enabled or disabled to effect disconnection.

The device may include a locking feature, operating on the grip portion end of the device, by which movement of the device to effect disconnection of the terminal fitting from a terminal can be prevented. A key may be required to enable such disconnection. Where there is an inner and an outer sleeve which have to move relative to one another, the locking feature may control whether or not the two sleeves are locked to one another.

As well as transmitting the torque from the grip portion to the head, the sheath may be constructed so that its bend radius is limited. This will prevent the optical cable being bent at too sharp an angle close to the connector. The sheath is preferably a plastics moulding, and it is preferred to construct the sheath so that it has a smooth continuous inner face and an articulated outer face and is substantially inextensible in an axial direction. Preferably the sheath is constructed so that the minimum bend radius determined by the articulated outer face is selected preferably to provide a bend radius limit of 35 mm.

In a preferred embodiment the device incorporates a ratchet mechanism between the grip portion and the head. The ratchet mechanism which determines the maximum applied torque may be housed in the grip portion or in the head.

The ratchet mechanism is preferably constructed so that the torque which can be applied on tightening is limited, but the torque which can be applied on untightening is not limited.

The grip portion preferably surrounds the cable, when in use, and has a radiused distant end or a tapered flexible tail through which the cable leaves the tool and which helps to prevent the cable being bent through too large an angle.

Because the end terminal fittings on optical cables will often be applied to the cables in a factory, the devices set forth above may be fitted on the cables before the cable is terminated.

Accordingly, the invention extends to an optical cable having a terminal end, a flexible sheath extending axially from the head and surrounding the cable, and a grip portion connected to the head by the sheath so that motion of the grip portion is transmitted through the sheath to the head.

The cable may have an optical fibre cable connector mounted at its terminal end, the connector having a terminal fitting for connection to a terminal, and the head, the sheath and the grip portion then forming a connection device fitted over the cable, with the head receiving the fitting in a manner such that motion can be transmitted from the head to the fitting.

Optical cables are often mounted to a terminal plate which carries a plurality of optical fibre cable terminals. By use of the invention, it becomes possible to mount a shield to protect the line of each optical path through each terminal. Since the light channelled along the optical path will follow a straight line, such shielding can effectively prevent the light beam impinging on a surface where it should not impinge. However because the device of the invention allows connection of a cable to the terminal along a non-straight path, the connection can be properly made despite the presence of a shield.

BRIEF DESCRIPTION OF THE DRAWINGS

The invention will now be further described, by way of ample, with reference to the accompanying drawings, in which.

FIG. 12 is a section through another connection device in accordance with the invention, with a key operated locking mechanism;

FIGS. 13 and 14 are two sections, taken 90° apart, through yet another connection device in accordance with the invention;

FIG. 15 shows a sleeve for the connection device of FIGS. 13 and 14;

DETAILED DESCRIPTION OF THE EMBODIMENTS

Figure 1:
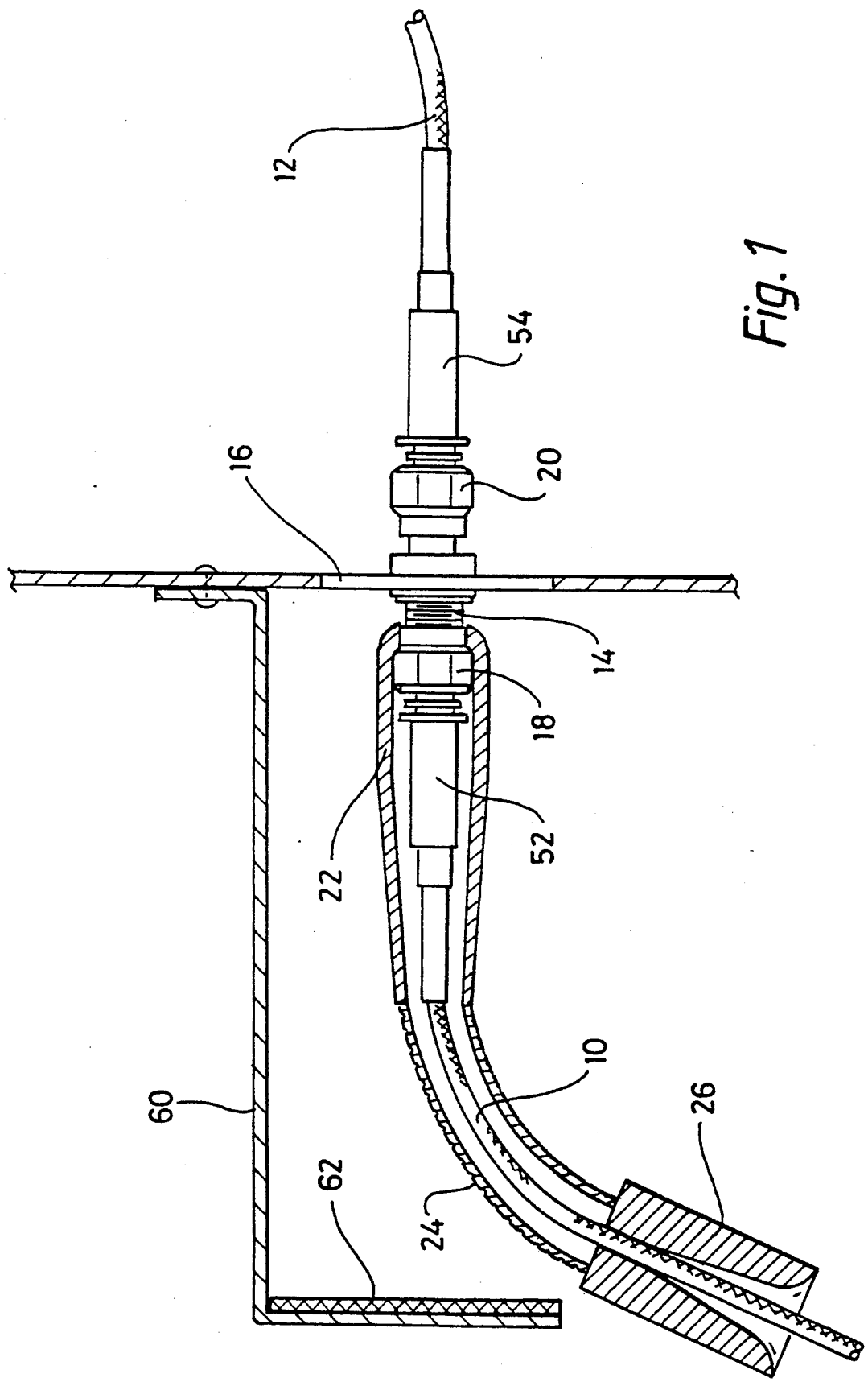
FIG. 1 shows an optical fibre cable terminal.

FIG. 1 shows a first optical cable 10 and a second optical cable 12 connected to opposite ends of a terminal on a patch panel 16. Each cable 10, 12 has a connector 52, 54 which ends in a nut 18, 20 and these nuts are screwed onto corresponding threaded bosses on the terminal 14.

Each cable has a core in the form of an optical fibre which forms a transmission path for optical communications signals. This fibre is protected by a cable sheath, in a manner which is already known.

In order to make a connection between the optical fibre cable 10 and a terminal 14, it is necessary to screw the nut 18 onto a threaded part of the terminal, and to tighten the nut with the specified torque.

Conventionally the nut 18 has been tightened either by hand or by use of a spanner. However it is often difficult to apply the required torque by hand, and access to the nut by means of a spanner is often difficult.

Figure 2:
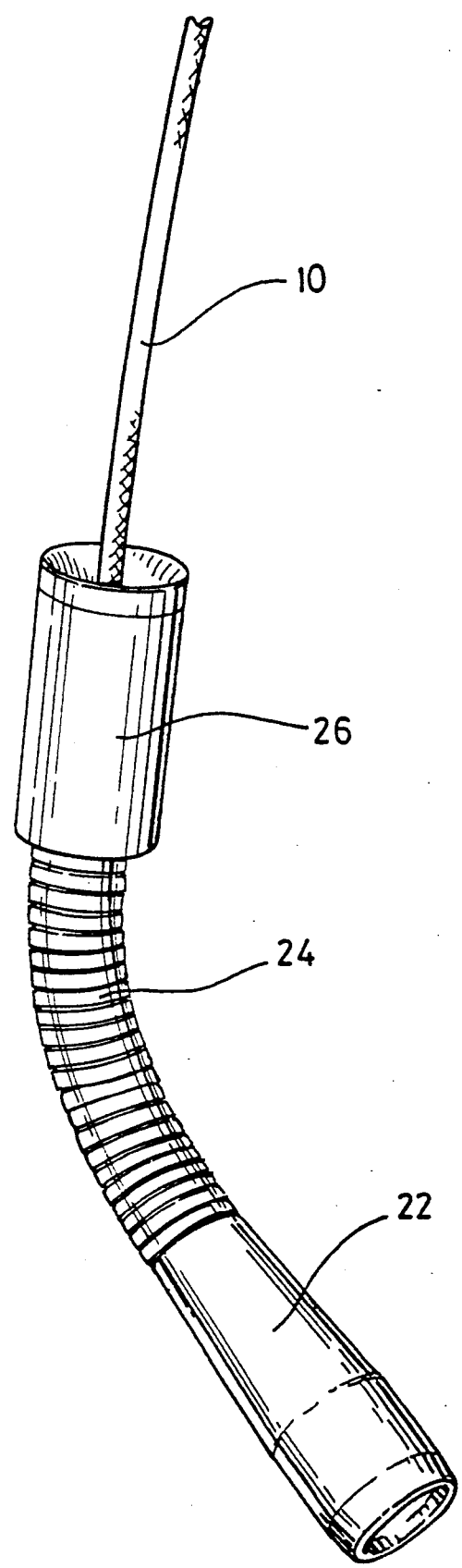
FIG. 2 is a perspective view of a device in accordance with the invention, fitted on a cable.

In order to overcome these difficulties, the device shown in FIGS. 1 and 2 is fitted over the end of the cable 10, as shown diagrammatically in FIG. 1. The device has three parts; a head 22 which surrounds and grips the nut 18, a flexible sheath 24 and a grip portion 26. The grip portion 26 is constructed so that it can be gripped by the fingers and rotated. The flexible sheath 24 is constructed so that whilst it can flex, it also transmits torque from the grip portion 26 to the head 22, where the torque is applied to the nut to tighten the nut on the thread 14.

Details of the construction of the device will be shown in the remaining Figures.

FIG. 2 shows the head 22 and the flexible sheath 24 on a larger scale. It will be seen that the head accommodates the whole of the cable connector 52, 54 along with the nut 18 which is retained at the end of the connector.

The flexible sheath 24 has a smooth inner surface and has its outer surface formed with circumferential grooves. These allow the sheath to flex, but the flexing is limited by the opposite edges of the grooves coming into contact with one another on the inside of the bend, as shown in FIG. 2. This type of flexible sheath construction therefore provides a limit on the amount of bending which can take place, provides a smooth inner surface in contact with the optical cable and is not extensible or contractable in the axial direction. The sheath will also transmit torque from the grip portion 26 to the head 22. It is to be noted however that the particular sheath construction shown in FIGS. 2, 3, 4 and 6 is only one example of a particular type of sheath construction, and other flexible sheath forms may be used. It is however preferred that they should be constructed so as to limit the bending radius, because optical fibres themselves are subject to a minimum bending radius to which they can be subjected without damage. If the bending radius of the sheath is greater than the minimum bending radius of the fibre cable, then that part of the fibre cable adjacent to the connector and within the sheath cannot be damaged by bending.

Figure 5:
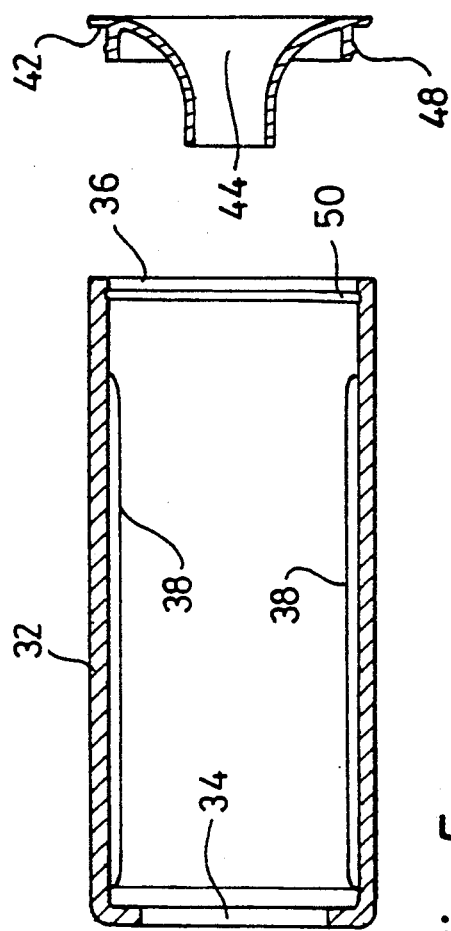
FIG. 5 is an exploded view of the end of the device shown in FIG. 4.
Figure 4:
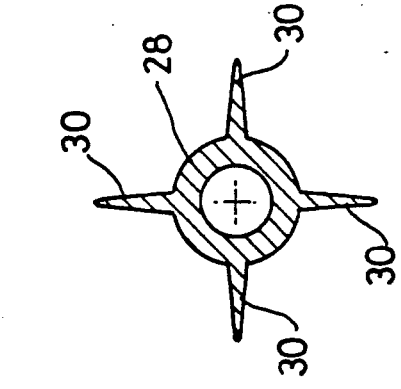
FIG. 4 is a cross section through the other end of a connection device.

FIG. 4 is an exploded view of the outer end of the device with the components of the grip portion separated from one another. The first part of the grip portion is moulded in one piece with the sheath 24 and comprises a central tube 28 on which flexible, radially extending wings 30 are formed. These wings can be seen in FIG. 5, and are constructed of a plastics material such that the wings can flex in a circumferential direction.

The second part of the grip portion is a body 32 with an opening 34 at one end and an opening 36 at the other end. Inside the body 32 are longitudinal splines 38.

The tip-to-tip distance across two diametrically opposite wings 30 is slightly greater than the internal diameter of the body 32.

To assemble the grip portion, the wings 30 on the tube 28 are elastically deformed in a clockwise circumferential direction (as viewed in the direction of the arrows on section line V—V) so that the opening 34 of the body 32 can be passed over them until it clicks into a receiving groove 40. The wings 30 then spring back to engage with the splines 38. To complete the assembly, an end cap 42 is fitted in the opening 36 and has a bell mouth 44 through which the cable exits, the curvature of the bell mouth being intended to prevent the cable being bent sharply. The end cap is held in place by engagement between a circumferential rib 48 and a retaining groove 50 on the body. Alternatively the cap could be held in place by adhesive.

Figure 3:
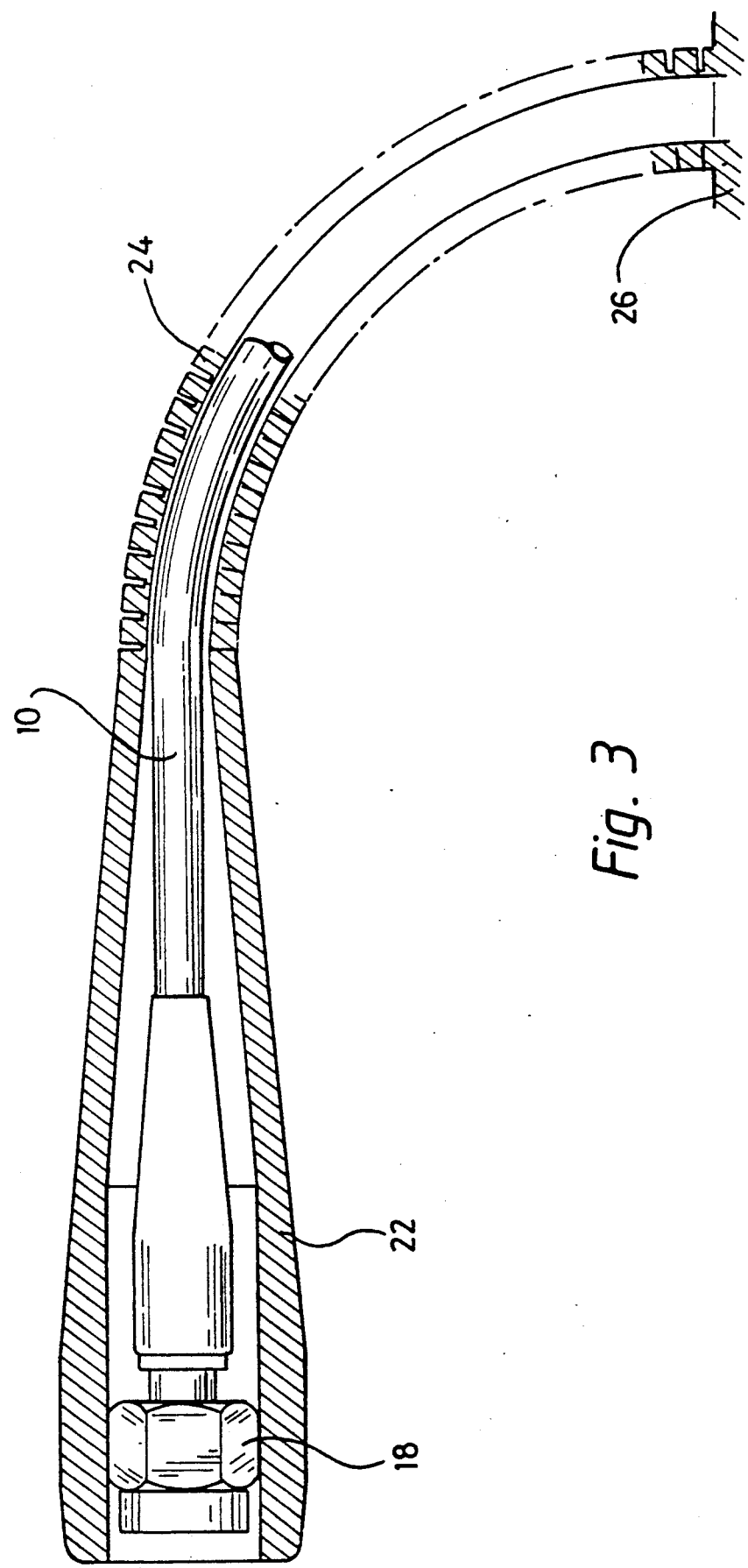
FIG. 3 is a cross section through one end of a connection device in accordance with the invention, at a considerably larger scale than that of FIG. 1.

The assembled grip portion is shown in FIG. 3. When the outer body 32 is rotated in a clockwise circumferential direction (as viewed in the direction of the arrows on section line V—V), it will rotate freely until the splines 38 come into contact with the wings 30. Further rotation of the body will rotate the central tube 28, the sheath 24 and the head 22 until the torque applied to the outer body resulting from the resistance of the nut 18 to further tightening is sufficiently great to overcome the resilience of the wings 30. At this point the wings will flex, the splines 32 will jump over the wings and no greater torque can be transmitted. This therefore limits the torque which can be applied when tightening the nut 18.

The level at which the torque is limited can be determined by the relative dimensions of the wings 30 and the splines 38 and by the material and the construction of the wings 30. For example, the axial length of the splines 38 could be changed so that they engage with only some, rather than with all of the wings 30, and in this way substantially the same mouldings could be used to produce grip portions which have different torque limits.

When the outer body 32 is rotated in an anti-clockwise circumferential direction (as viewed in the direction of the arrows on section line V—V), it will rotate freely until the splines 38 come into contact with the wings 30. Due to the previous clockwise deformation of the wings at the time of assembly, the splines will now engage with the ends of the wings and the wings cannot deform further therefore locking the ratchet and enabling a high torque to be applied to the nut 18 to release the nut from the terminal 14.

Figure 6:
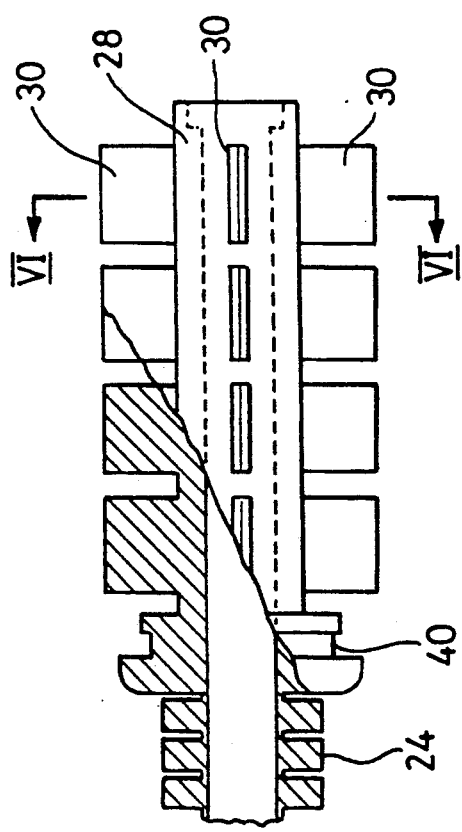
FIG. 6 is a section through part of the device of FIG. 5, on the line VI—VI.

FIG. 6 is a view very similar to FIG. 2, but showing the head portion 22 engaged with a knurled ring 46 on the end of the cable.

Figure 7:
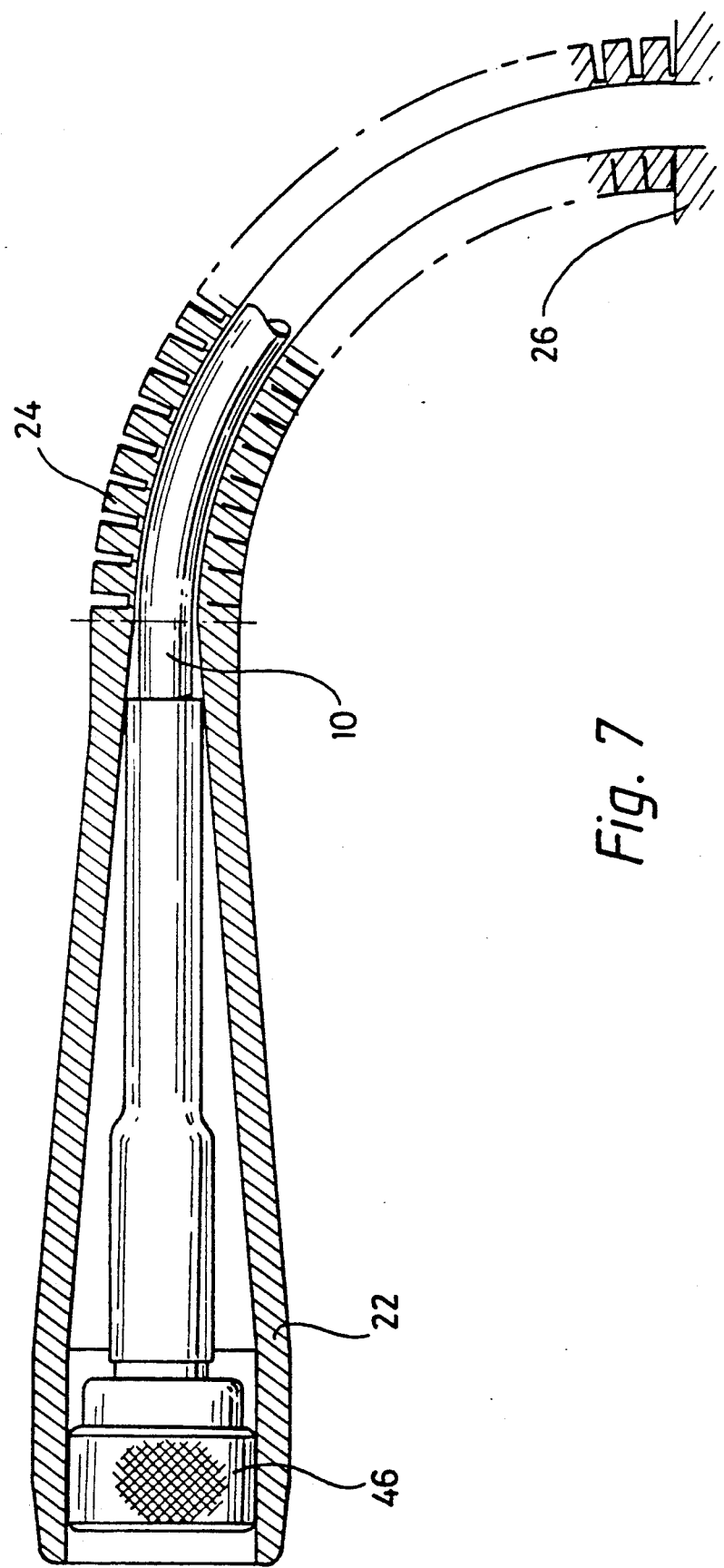
FIG. 7 is a view similar to FIG. 3, but showing an alternative embodiment.
Figure 8:
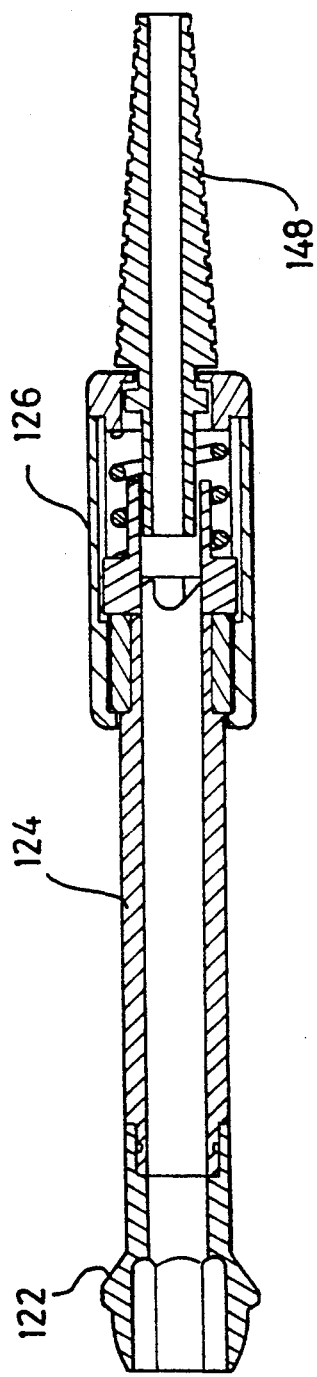
FIG. 8 is a cross section through a third form of connection device in accordance with the invention.
Figure 9:
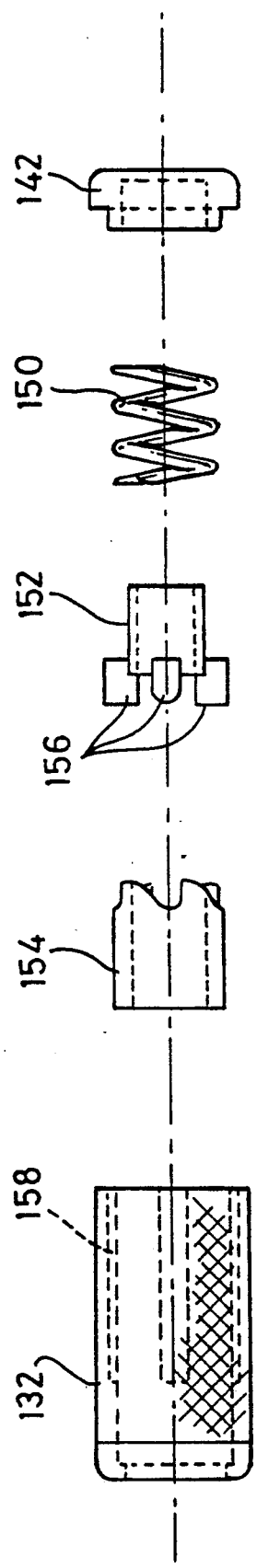
FIG. 9 is an exploded view of the grip portion of the device of FIG. 7.

FIG. 7 shows an alternative embodiment which has a head 122, a flexible sheath 124 and a grip portion 126. On the end of the grip portion opposite to the sheath 124 is a flexible cable guide 148. In this embodiment, the head 122, sheath 124 and grip portion 126 are all made as separate components, in contrast to the earlier embodiment where the head, sheath and centre of the grip portion are all made as a single plastics moulding. In this case the grip portion 126 has an internal ratchet mechanism controlled by a coil spring 150 which limits the torque applied from the grip portion to the sheath. The spring 150 urges a spider 152 against a ramped sleeve 154 and when the preset torque is reached, the spring 150 is compressed and the cams 156 on the spider 152 ride up the ramps on the sleeve 154 to prevent further torque being transferred. The cams 156 slide in slots 158 on the inside of a sleeve 132 to transmit the torque from the sleeve to the spider.

It will be seen that the ramps on the sleeve 154 have different angles of inclination in opposite directions so that whilst torque is limited in the screwing up direction, a much higher torque can be applied in the unscrewing direction.

The grip portion assembly is completed by a cap 142 which retains the cable guide 148.

Although the embodiments shown include the torque limiting mechanism in the grip portion, it is not essential that the mechanism be located there. It is also possible that the torque limiting mechanism could be located in the head, immediately adjacent to the nut 18, 46 which is to be rotated.

Normally a device as described will be located at each end of each optical cable during manufacture of the cable, and will remain fitted on the cable at all times.

The use of this device ensures that optical fibre cables can be properly connected to terminals on patch panels or elsewhere without damaging the cable and whilst ensuring that the cable is correctly tightened. If desired the body of the grip portion could be colour coded to provide a quick and easy identification of the preset torque limit.

The fact that the nut on the end of the cable can be tightened remotely also has additional benefits. It is desirable to be able to shield the straight-line path leading from an unconnected optical terminal, to prevent somebody inadvertently looking along the optical path. This could lead to eye damage if there is an optical signal being passed along that path. If the cable connectors are fitted with devices as described here, then a shield 60 (shown in FIG. 1) can be placed on the line of the optical path and a cable can be tightened from a position offset from the optical path. In order to prevent unwanted reflections, a layer 62 of non-reflective material can be fitted to the shield.

Figure 10:
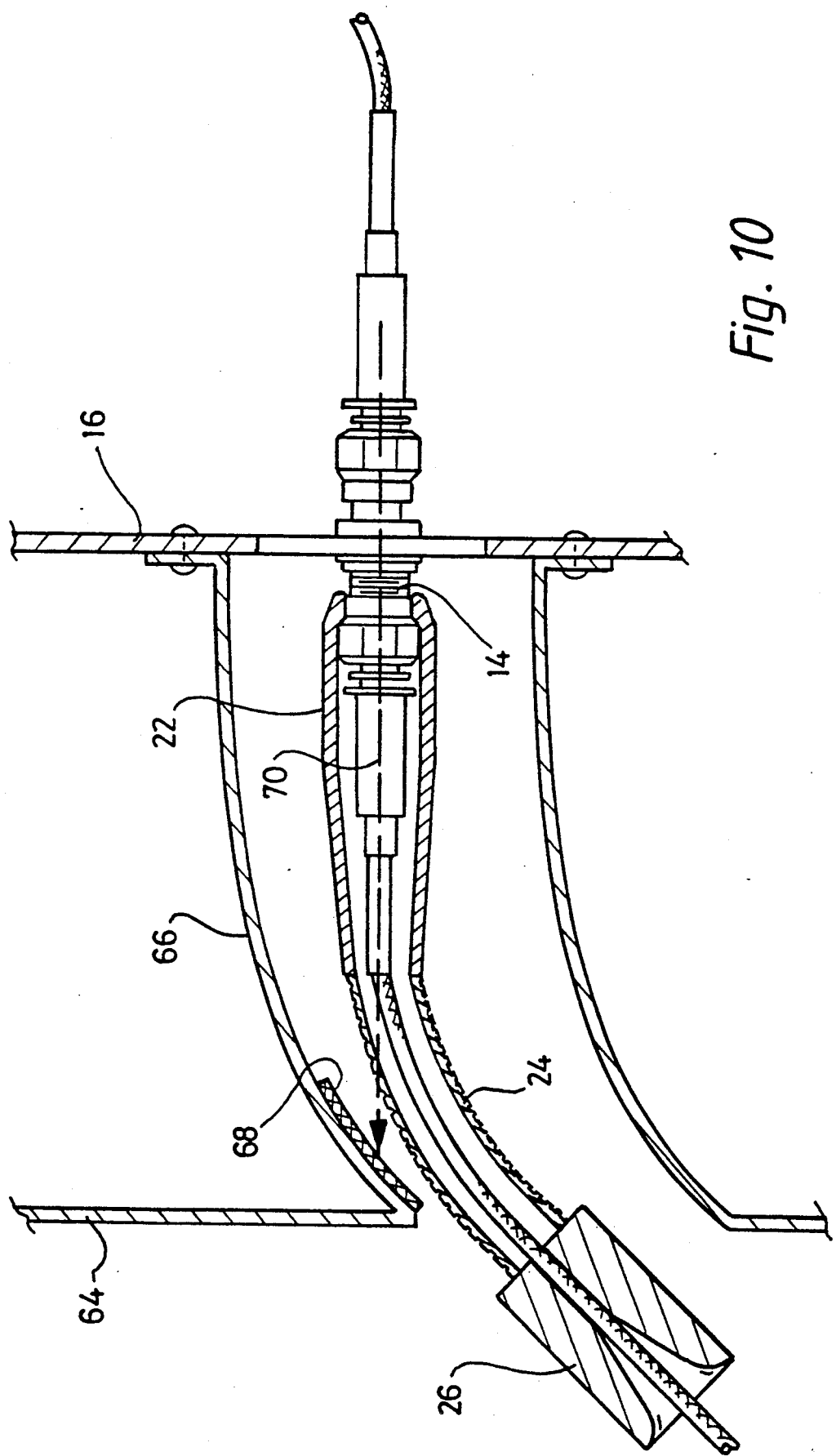
FIG. 10 is a view similar to FIG. 1 but showing an alternative terminal arrangement.

FIG. 10 shows an alternative arrangement where a secondary panel 64 is secured to the panel 16. A curved channel 66 runs between the panels 16 and 64 to provide a path for the cable. A non-reflective coating 68 could be applied to that surface of the channel 66 which lies on the straight line light path 70 through the terminal 14.

The device may also incorporate a controlled access facility whereby the device will only transmit unlocking torque if a control key is present, and this feature can be used to prevent unauthorised removal of cables.

Additionally, in place of the shielding 60, 66, the device may be constructed so that when it is disconnected from a terminal, a shutter drops across the light transmission path and is automatically lifted when the cable with the device is reattached to a terminal 14.

Figure 11:
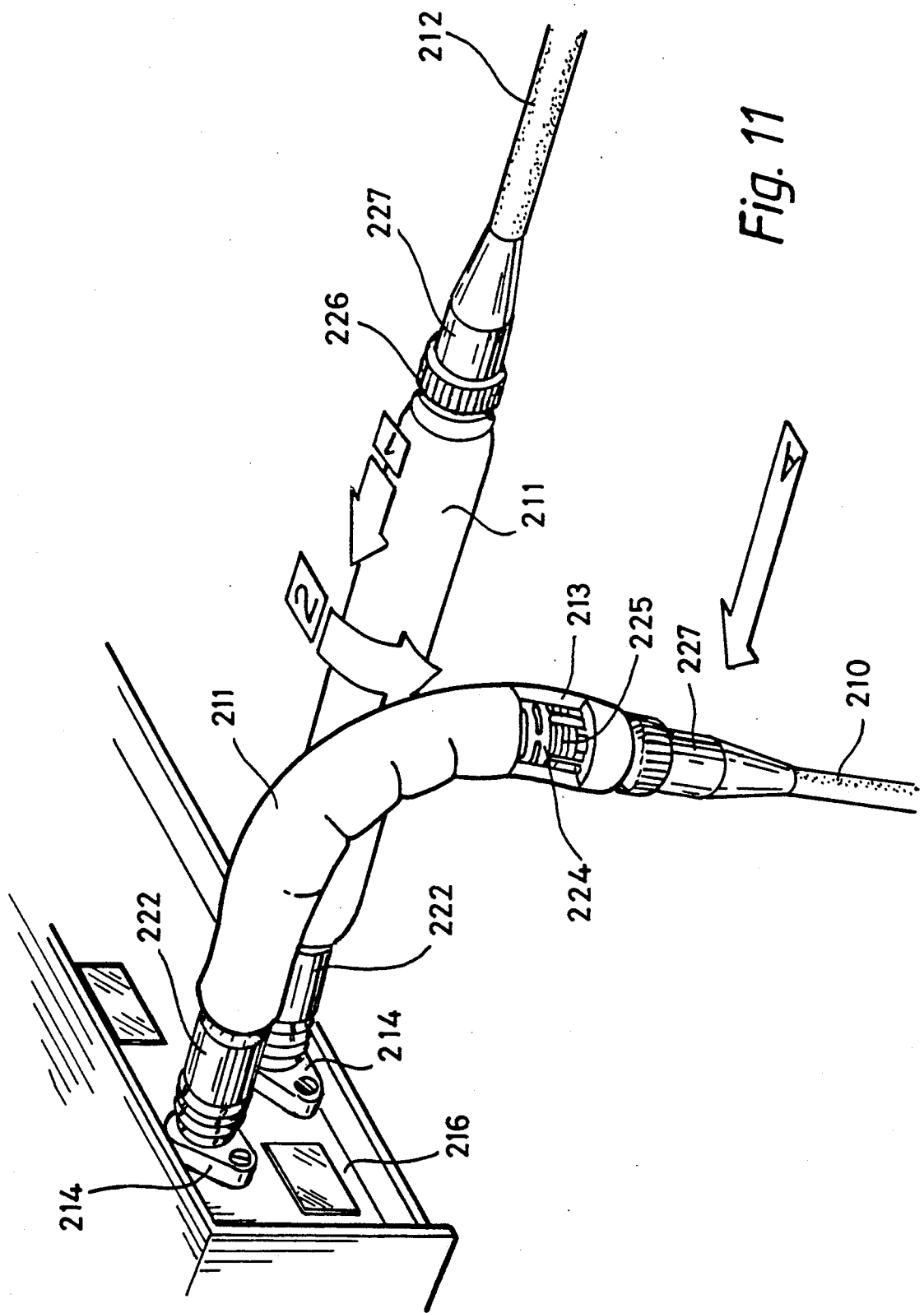
FIG. 11 is a pictorial view showing two optical fibres connected to terminals.

FIG. 11 shows a panel 216 on which two terminals 214 are mounted. Optical cables 210, 212 are connected to these terminals. The ends of the cables 210, 212 are surrounded by connection devices 211. As can be seen in the cut-away part of the device 211 on the cable 210, the connection device has an outer soft neoprene sleeve 213, an outer, bend-limiting sheath 224 and an inner sheath 225 in the form of a coil spring. The devices also have a grip portion at 226 and a head at 222.

The connection devices shown in FIG. 11 are intended to be "secure", i.e. once the connections between the cables and the terminals 214 have been made, they can only be disconnected by the use of a special key. The key will be inserted in the direction of the arrow A into slots 227. This will produce movement between the outer sheath 224 and the inner sheath 225 in the direction indicated by the arrow "1". Once this movement has taken place, the grip portion 226 can be rotated in the direction indicated by the arrow "2" to release the connection between the cable and the terminal 214. The mechanism by which this can be accomplished will be described in more detail with reference to FIG. 12. The terminal 214 is a bayonet-type connector which has a central bore 217 into which the cable itself is inserted for alignment, and an outer sleeve which has a pair of opposite radially directed lugs 219. As can be seen in FIG. 12, the terminal 214 is substantially symmetrical about the plane of the plate 216 and can receive a cable by means of a bayonet-type connection on either side of the plate.

A bayonet collar 220 which engages with the lugs 219 is acted upon by the spring which forms the sheath 225. However as can be seen at the left hand side of FIG. 12, the spring 225 is free and normally exerts no force on the collar 220.

The collar 220 is engaged through splines or a similar engagement with a shroud 223 which is integral with the outer sheath 224. However under normal conditions, when the spring 225 exerts no force on the collar 220, it will not be possible to turn the collar to disengage the bayonet connection.

A key 229 which has a head 230 and two legs 232 is shown in both front and side view at the top left hand corner of FIG. 12. This key can be inserted in the slots 227 so that the legs 232 engage either side of a collar 234 at the end of the spring 225. When the key is inserted and pushed fully home, the collar 234 is pushed to the right and this transmits a force to the bayonet collar 220. When the bayonet collar is thus in a pushed forward position, subsequent rotation of the device 211 will allow the connection to be disassembled.

FIGS. 13 and 14 show an alternative type of connector which acts with a push-fit action. To make the joint, a male connector body 320 is pushed into a female terminal 314 until a snap locking engagement is achieved between lugs 319 and 318. This then holds the connection in its assembled condition.

To disassemble the joint, the lugs 318 have to be lifted clear of the lugs 319, and this can be done by pulling axially on a slider 321 which is gripped inside an end shroud 323 of the bend limiting sheath 324. This type of connector is known as an "SC" connector.

As shown in FIGS. 13 and 14, there is no locking feature and the joint can be assembled or disassembled merely by pushing or pulling at the remote end of the connection device 311.

SC fibre optic connectors are however manufactured (for example by the Japanese company NTTI) which have no built-in disconnection mechanism, and which require a special tool to be used for disconnection. However to avoid the use of such a special tool the device of the invention may include an inner, release member which is moveable relative to the slider 321 and which has to be moved relative to the cap to release the device. In such a case, a connection device as shown in FIG. 15 with an internal spring 325 may be used with a key arrangement as shown in FIG. 12 to either connect the spring 325 to the outer sheath 324, or to allow the two to move independently.

Figure 17:
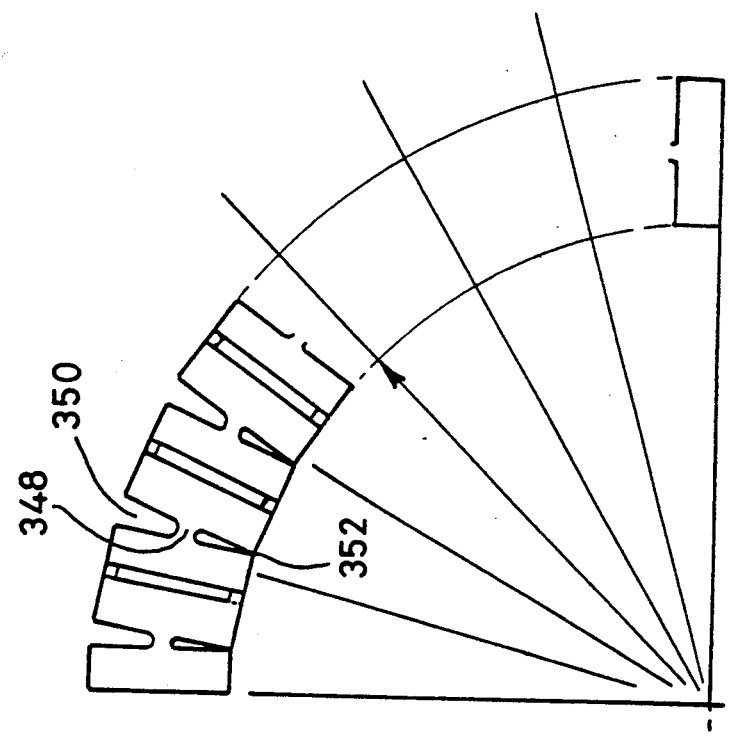
FIG. 17 shows the sleeve of FIG. 16 bent to its maximum permissible radius.
Figure 16:
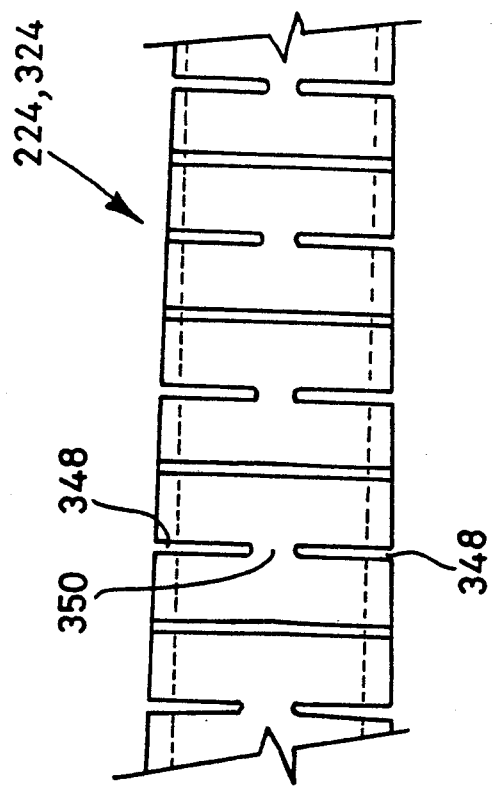
FIG. 16 shows part of a bend-limiting sleeve.

FIGS. 16 and 17 show the bend limiting properties of the sheath 224, 324 in more detail. The sheath has transverse slots 348 cut into the tube wall, the slots extending towards the centre of the tube but not quite to the centre so that a vestigial wall section 350 remains. Adjacent slots are rotated through 90° relative to one another so that the finished sleeve can be bent in the manner shown in FIG. 17, with the extent of bending being limited, for example to a bend radius of 35 mm. This serves to prevent any damage to the optical cable at the point where it leaves the connector.

What I claim is:

1. A device for use in connecting optical fibre cables, the device comprising a head directly mounted on the device and engaging with a separate terminal fitting already secured to a terminal end of an optical fibre cable, a flexible sheath extending axially from the head and surrounding the cable, and a grip portion connected to the head by the sheath so that motion of the grip portion is transmitted through the sheath to the head.

2. A device as claimed in claim 1, wherein the terminal fitting has a nut which is secured to the cable end, and the head engages with the nut.

3. A device as claimed in claim 2, wherein the head is adapted to slide over the nut to grip the nut.

4. A device as claimed in claim 2, wherein the terminal fitting is a bayonet connector and the head engages with the connector in such a way that both axial and rotational movements can be transmitted between the head and the fitting.

5. A device as claimed in claim 2, wherein the terminal fitting is a push-fit connector and the head engages with the connector in such a way that axial movement can be transmitted between the head and the fitting.

6. A device as claimed in claim 4 or claim 5 and comprising an inner sleeve and an outer sleeve, wherein the outer sleeve may move relative to the inner sleeve, and this movement can either be enabled or disabled to effect disconnection.

7. A device as claimed in claim 6, including locking means operating on the grip portion end of the device, by which movement of the device to effect disconnection of the terminal fitting from a terminal can be prevented.

8. A device as claimed in claim 7, wherein a key is required to enable such disconnection.

9. A device as claimed in claim 7, wherein the locking means controls whether or not the two sleeves are locked to one another.

10. A device as claimed in claim 1, wherein the sheath includes articulated means having a selected minimum bend radius limit.

11. A device as claimed in claim 10, wherein the sheath is constructed so that the minimum bend radius of the sheath is 35 mm.

12. A device as claimed in claim 1, wherein the sheath is a plastics moulding, has a smooth continuous inner face and is substantially inextensible in an axial direction.

13. A device as claimed in claim 1, which incorporates a ratchet mechanism between the grip portion and the head.

14. A device as claimed in claim 13, wherein the ratchet mechanism is accommodated in the grip portion and determines the maximum torque which can be applied through the grip portion to the head.

15. A device as claimed in claim 13, wherein the ratchet mechanism is housed in the head.

16. A device as claimed in claim 13, wherein the ratchet mechanism is constructed so that the torque which can be applied on tightening is limited, but the torque which can be applied on untightening is not limited.

17. A device as claimed in claim 1, wherein the grip portion surrounds the cable, when in use, and has a radiused distant end through which the cable leaves the device and which helps to prevent the cable being bent through too large an angle.

18. An optical cable having a terminal end and a head mounted on the terminal end, a flexible sheath extending axially from the head and adapted to surround the cable, and a grip portion connected to the head by the sheath so that rotation of the grip portion is transmitted through the sheath to the head.

19. An optical cable as claimed in claim 18, wherein the cable has an optical fibre cable connector mounted at its terminal end, the connector has a nut for connection to a terminal, and the head, the sheath and the grip portion form a connection device fitted over the cable, with the head receiving the nut in a manner such that torque can be transmitted from the head to the nut.

* * * * *